United States Patent [19]

Takagi et al.

[11] Patent Number: 4,931,957
[45] Date of Patent: Jun. 5, 1990

[54] IMAGE INFORMATION PROCESSING APPARATUS

[75] Inventors: Shiro Takagi, Yokohama; Minoru Sato, Tachikawa, both of Japan

[73] Assignee: Kabushiki Kaisha Toshiba, Kanagawa, Japan

[21] Appl. No.: 141,770

[22] Filed: Jan. 11, 1988

[30] Foreign Application Priority Data

Jan. 12, 1987 [JP] Japan ................................. 62-4743

[51] Int. Cl.⁵ .......................... G09G 3/06; G06F 15/20
[52] U.S. Cl. .................................... 364/521; 340/710; 340/721; 340/747; 364/518; 364/523
[58] Field of Search ............................... 364/518–522, 364/523; 340/710, 711, 723, 712, 724, 721, 747

[56] References Cited

U.S. PATENT DOCUMENTS 4,665,555 5/1987 Alker et al. ................... 340/724 X
4,755,808 7/1988 Bullock et al. ................ 340/711 X
4,772,882 9/1988 Mical ............................. 340/712 X Primary Examiner—Gary V. Harkcom
Assistant Examiner—H. R. Herndon
Attorney, Agent, or Firm—Finnegan, Henderson, Farabow, Garrett and Dunner

[57] ABSTRACT

An image information processing apparatus for storing and retrieving image information on and from an optical memory means, which has a selecting means for sequentially manually selecting a plurality of image processing commands, a scanning means for inputting image information from an original image, a display means for display the image information and a designation means. The display means has at least two display areas and displays the image information from one of the scanning means and the optical memory means in only one of the two display areas in response to the selection of the selection means. The designation means manually designates the one of the display areas to display the image information.

11 Claims, 23 Drawing Sheets

|  |  |  | 203 |
|---|---|---|---|
| DOCUMENT FILING APPARATUS | | | DEC. 23, 1986 |
| DISPLAY MODE | EDIT FUNCTION | DB FUNCTION | OTHERS |

201

| 1 |
|---|
| FINAL |
|  |
| ENLARGE |
| REDUCE |
| ROTATE R |
| ROTATE L |
| ⇧ |
| ⇩ |
| ⇨ |
| ⇦ |
|  |

| F1 | F2 | F3 | F4 | F5 | F6 | F7 | F8 | F9 | F10 |
|---|---|---|---|---|---|---|---|---|---|
| SCANNER | PRINTER | DISPLAY | FILE |  |  |  |  |  | CANCEL |

| DOCUMENT FILING APPARATUS | | | DEC. 23, 1986 | |
|---|---|---|---|---|
| DISPLAY MODE | EDIT FUNCTION | DB FUNCTION | | OTHERS |

```
                                                      1
                                                    FINAL

ENLARGE

REDUCE

ROTATE R
```

SCANNER PROPERTY

| | |
|---|---|
| SIZE | : ( [A3], A4, A5, B4, B5 ) |
| DENSITY | : ( DARK, SLIGHTLY DARK, [NORMAL], SLIGHTLY LIGHT, LIGHT ) |
| RESOLUTION | : ( [NORMAL], FINE ) |
| FEED MODE | : ( [BOOK], ADF ) |
| READ DESIGNATION | : ( [CHARACTER], PHOTOGRAPH ) |
| PHOTOGRAPH MODE | : ( PHOTOGRAPH FINE, [STANDARD], CHARACTER CLEAR ) |
| ADD-ON DESIGNATION | : ( [YES], NO ) |
| DOCUMENT DIRECTION | : ( [VERTICAL], HORIZONTAL ) |

| F9 CONFIRM | F10 CANCEL |
|---|---|

| ≡F1≡ SCANNER | F2 PRINTER | F3 DISPLAY | F4 FILE | F5 | F6 | F7 | F8 | F9 | F10 CANCEL |
|---|---|---|---|---|---|---|---|---|---|

F I G. 4

| DOCUMENT FILING APPARATUS | | | | DEC. 23, 1986 |
|---|---|---|---|---|
| DISPLAY MODE | EDIT FUNCTION | DB FUNCTION | | OTHERS |

|  |  |
|---|---|
|  | 1 |
|  | FINAL |
|  |  |
|  | ENLARGE |
|  | REDUCE |
|  | ROTATE R |
|  | ROTATE L |
|  | ⇧ |

DISPLAY PROPERTY

DISPLAY TIME : NO TIME SETTING
DISPLAY TIME : 1 SEC.

| F9 CONFIRM | F10 CANCEL |

| F1 SCANNER | F2 PRINTER | F3 DISPLAY | F4 FILE | F5 | F6 | F7 | F8 | F9 | F10 CANCEL |
|---|---|---|---|---|---|---|---|---|---|

FIG. 6

| DOCUMENT FILING APPARATUS | | | DEC. 23, 1986 |
|---|---|---|---|
| DISPLAY MODE | EDIT FUNCTION | DB FUNCTION | OTHERS |

1

FINAL

FILE PROPERTY

BINDER NAME : [::::::::::]
FILE CONDITIONS : FILE [::::]/[::::]
PAGE [::::]/[::::]
REVISED [::]/[::]

1 READ OUT MODE : ( SUCCESSIVE , BATCH (PAGE)
         BATCH (DOCUMENT) )

READ ORDER ( ASCEND , DESCEND )

2 PAGING MODE : NO PAGE PROCESSING
    PAGE ADDITION
    TOTAL NUMBER OF ADDITIONAL
    PAGES (_____)
    PAGE INSERTION
    TOTAL NUMBER OF INSERTED
    PAGES (_____)
    REVISED EDITION (_____)

3 INDEX NAME (_____)

| | F9 CONFIRM | F10 CANCEL |
|---|---|---|

| F1 SCANNER | F2 PRINTER | F3 DISPLAY | F4 FILE | F5 | F6 | F7 | F8 | F9 | F10 CANCEL |
|---|---|---|---|---|---|---|---|---|---|

F I G. 7

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F1)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F3)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F3)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ IN BY THE SCANNER IS DISPLAYED IN THE DOCUMENT WINDOW (e)

(F7)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

↓ (F10)

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 8

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F1

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F10 →

↓ F2

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F10 →

↓ F2

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ IN BY THE SCANNER IS PRINTED OUT (e) F7

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

↓ F10

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F1)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

(F4)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

(F4)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT READ BY THE SCANNER IS RECORDED INTO THE OPTICAL DISK (F7)

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

(F10)

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 10

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F4

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ F10

↓ F3

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ F10

↓ F3

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

ONE DOCUMENT RETRIEVED FROM THE OPTICAL DISK IS DISPLAYED IN THE DOCUMENT WINDOW

F7 OR F8

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | PREV. PAGE | | CANCEL |

↓ F10

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 11

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F4)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F2)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F2)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT RETRIEVED FROM THE OPTICAL DISK IS PRINTED OUT (F7) OR (F8)

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | PREV. PAGE | | CANCEL |

↓ (F10)

(f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 12

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F3)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F2)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F2)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT BEING DISPLAYED IN THE WINDOW IS PRINTED OUT (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F3)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F4)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

(F10)

↓ (F4)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT BEING DISPLAYED IN THE WINDOW IS RECORDED INTO THE OPTICAL DISK (e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F1

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ F10

↓ F3

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ F10

↓ F2

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ F10

↓ F2

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT FROM THE SCANNER IS DISPLAYED IN THE DOCUMENT WINDOW (f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | PRINT | REEN-TER | | CANCEL |

→ F8
→ F10

↓ F7 — THE DOCUMENT IN THE DOCUMENT WINDOW IS PRINTED OUT (g)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

F7 ↺

↓ F10

(h)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F1

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F3

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F4

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ F4

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | |

THE DOCUMENT FROM THE SCANNER IS DISPLAYED IN THE DOCUMENT WINDOW (f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | RECORD | REEN-TER | | CANCEL |

↓ F7

THE DOCUMENT IN THE DOCUMENT WINDOW IS RECORDED INTO THE OPTICAL DISK (g)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | NEXT PAGE | | | CANCEL |

↓ F10

(h)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

F I G. 16

(a)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

↓ (F4)

(b)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

↓ (F3)

(c)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

↓ (F2)

(d)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

↓ (F2)

(e)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | |

A DOCUMENT FROM THE OPTICAL DISK IS DISPLAYED IN THE DOCUMENT WINDOW (f)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | PRINT | NEXT PAGE | PREV. PAGE | CANCEL |

(F8) OR (F9)

THE DOCUMENT IN THE DOCUMENT WINDOW IS PRINTED OUT (F7)

(g)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | NEXT PAGE | PREV. PAGE | CANCEL |

↓ (F10)

(h)

| F1 | F2 | F3 | F4 | F5 | F6 | F7 | F8 | F9 | F10 |
|----|----|----|----|----|----|----|----|----|-----|
| SCANNER | PRINTER | DISPLAY | FILE | | | | | | CANCEL |

F I G. 17

(a)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

↓ (F1)

(b)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F3)

(c)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F4)

(d)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

→ (F10)

↓ (F4)

(e)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | STOP | | | | |

(F6) REPEAT THE FOLLOWING STEPS:
· TO READ A DOCUMENT BY THE SCANNER AND
· TO DISPLAY IT IN THE DOCUMENT WINDOW
· TO RECORD THE DOCUMENT IN THE DOCUMENT WINDOW (f)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | | | | | CANCEL |

← (F10)

↓

(g)

| F1 | F2 | F3 | F4 | F5 | F6 | F7 | F8 | F9 | F10 |
|---|---|---|---|---|---|---|---|---|---|
| SCANNER | PRINTER | DISPLAY | FILE | | CONT. | | REEN-TER | | CANCEL |

(F6) ↰  (F8) ↻

F I G. 18

(a) DESIGNATION TABLE

| NUMBER OF DESIGNATED ICONS | 1ST | 2ND | 3RD |
|---|---|---|---|
|  |  |  |  |

(b) TRANSFER TABLE

| NO | NUMBER OF DESIGNATED ICONS | 1ST | 2ND | 3RD |
|---|---|---|---|---|
| 1 | 2 | SCANNER F1 | DISPLAY F3 |  |
| 2 | 2 | SCANNER F1 | PRINTER F2 |  |
| 3 | 2 | SCANNER F1 | FILE F4 |  |
| 4 | 2 | FILE F4 | DISPLAY F3 |  |
| 5 | 2 | FILE F4 | PRINTER F2 |  |
| 6 | 2 | DISPLAY F3 | PRINTER F2 |  |
| 7 | 2 | DISPLAY F3 | FILE F4 |  |
| 8 | 3 | SCANNER F1 | DISPLAY F3 | PRINTER F2 |
| 9 | 3 | SCANNER F1 | DISPLAY F3 | FILE F4 |
| 10 | 3 | FILE F4 | DISPLAY F3 | PRINTER F2 |

F I G. 20

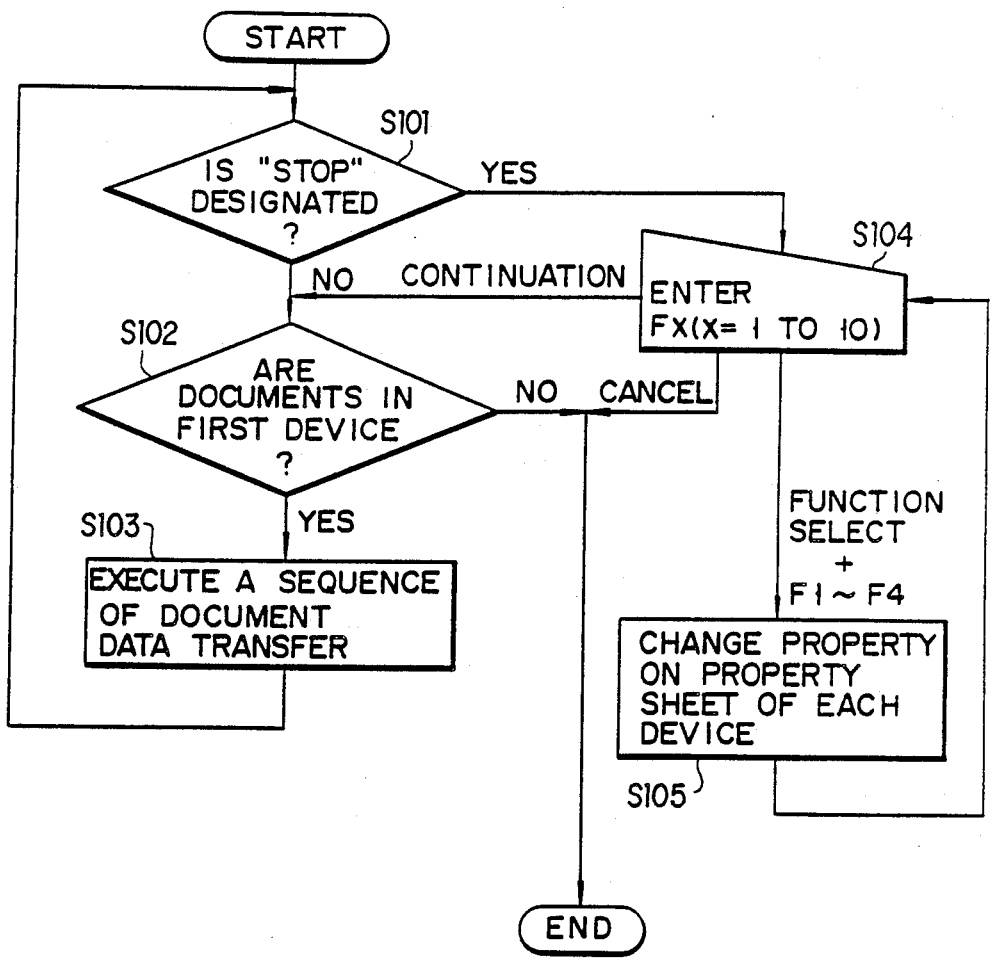
F I G. 21

F I G. 22

IMAGE INFORMATION PROCESSING APPARATUS

FIELD OF THE INVENTION

This invention relates to an image information processing apparatus which is adapted for storing and retrieving image information by using an optical disk memory. More specifically, the invention relates to an image information processing apparatus for executing an image processing operation according to a menu displayed on a display device which includes a plurality of display areas.

BACKGROUND OF THE INVENTION

In recent times, several data processing apparatuses have been developed and put to practical use.

For example, an image information processing apparatus, such as a document filing apparatus, is used for storing and retrieving image information on and from an optical disk memory. One conventional document filing apparatus is disclosed in U.S. Pat. No. 4,604,653. In the document filing apparatus of the type described above, image information on documents is read by a scanner and such image information is stored on the optical disk memory. The apparatus is provided with a display device using a cathode ray tube. The document is scanned by the scanner and the scanned image is transferred to the display device. Corresponding image information obtained from the scanning is stored on the optical disk memory. Desired image information is retrieved as needed and displayed by the display device.

The above-mentioned apparatus can perform a variety of operations such as image retrieval, image recording, image deletion, and others. To operate the apparatus, an operator designates or selects one of the above operations, as desired, whereupon the apparatus performs the desired operation.

For example, when the operator designates "image retrieval", the apparatus then operates in the image retrieval mode and, having retrieved the desired image information from the optical disk memory, displays the image information in the display device, and prints the image information.

Each operation mode of the apparatus is composed of many hierarchy sub-modes, which implies that, in any of the operation modes, a given task can be accomplished only after the sub-modes have been performed. In addition, in the apparatus, a given task can be accomplished only by use of a specific designated operation mode. Therefore, when the apparatus completes every operation, it must return to the initial mode. Consequently, the apparatus cannot continuously operate in different modes, and its operation as a whole is rather inefficient.

To solve the above problem, a related U.S., application, Ser. No. 099,902 filed September 22, 1987, now U.S. Pat. No. 4,885,704 discloses a document filing apparatus capable of executing a plurality of processing operations with a few key operations.

Also, as is well known, a data processing apparatus, such as a personal computer system, having a plurality of display areas has been developed. The above-mentioned system is disclosed in "Window and Window Based Tools: Beginner's Guide" Part No.: 800-1287-03 Revision A of February 17, 1986 pp39–44. In the apparatus, a plurality of display areas are displayed on one screen of a display device. Also, a cursor is displayed on the screen of the display device and is moved on one of the display areas by means of a pointing device such as a mouse, to designating a desired processing execution. However, the document filing apparatus of the type described above has not been used with a display device having a plurality of display areas.

SUMMARY OF THE INVENTION

Accordingly, it is an object of the present invention to provide an improved image information processing apparatus which has a plurality of display areas for image information.

It is another object of the present invention to provide an image information processing apparatus having a plurality of display areas capable of executing image processing operations, such as image retrieval and image record, with a few key operations.

In accordance with the present invention, the foregoing objects and others are achieved by providing an image information processing apparatus including selecting means for sequential manual selecting at least two from among a plurality of image processing commands including at least a scanning command, a display command and a file command; scanning means for inputting image information from an original image only in response to sequential selection of the scanning command and at least one of the display command and the file command in the selection means, optical memory means for storing the image information input by the scanning means only in response to sequential selection in the selection means of the scanning command followed by at least one of the file command and a sequential combination of the display command and the file command, display means, including at least two display areas, for fisplaying the image information from one of the scanning means and the optical memory means in only one of the two display areas in response to one of sequential selection of the scanning command and the display command and sequential selection of the file command and the display command, respectively and designation means for manually designating the one of the two display areas to display the image information.

BRIEF DESCRIPTION OF THE DRAWINGS

FIG. 2 shows a display device including a single display area on a display screen;

FIGS. 3A, 3B and 3C show display devices, each containing four display areas;

FIG. 4 shows a display device displaying scanner properties;

FIG. 6 shows a display device displaying display properties;

FIG. 7 shows a display device displaying file properties;

FIGS. 8 to 18 diagrammatically show transient phases of various document data transfer modes;

FIG. 20 shows a designation table and a transfer table;

FIG. 21 is a flowchart illustrating a flow of the document data transfer operation when a continuous document read-out mode is used; and FIG. 22 shows a transient phase of document data transfer operations, using a function area with a function for starting document data transfer operations.

DETAILED DESCRIPTION OF THE PREFERRED EMBODIMENTS

Figure 1:
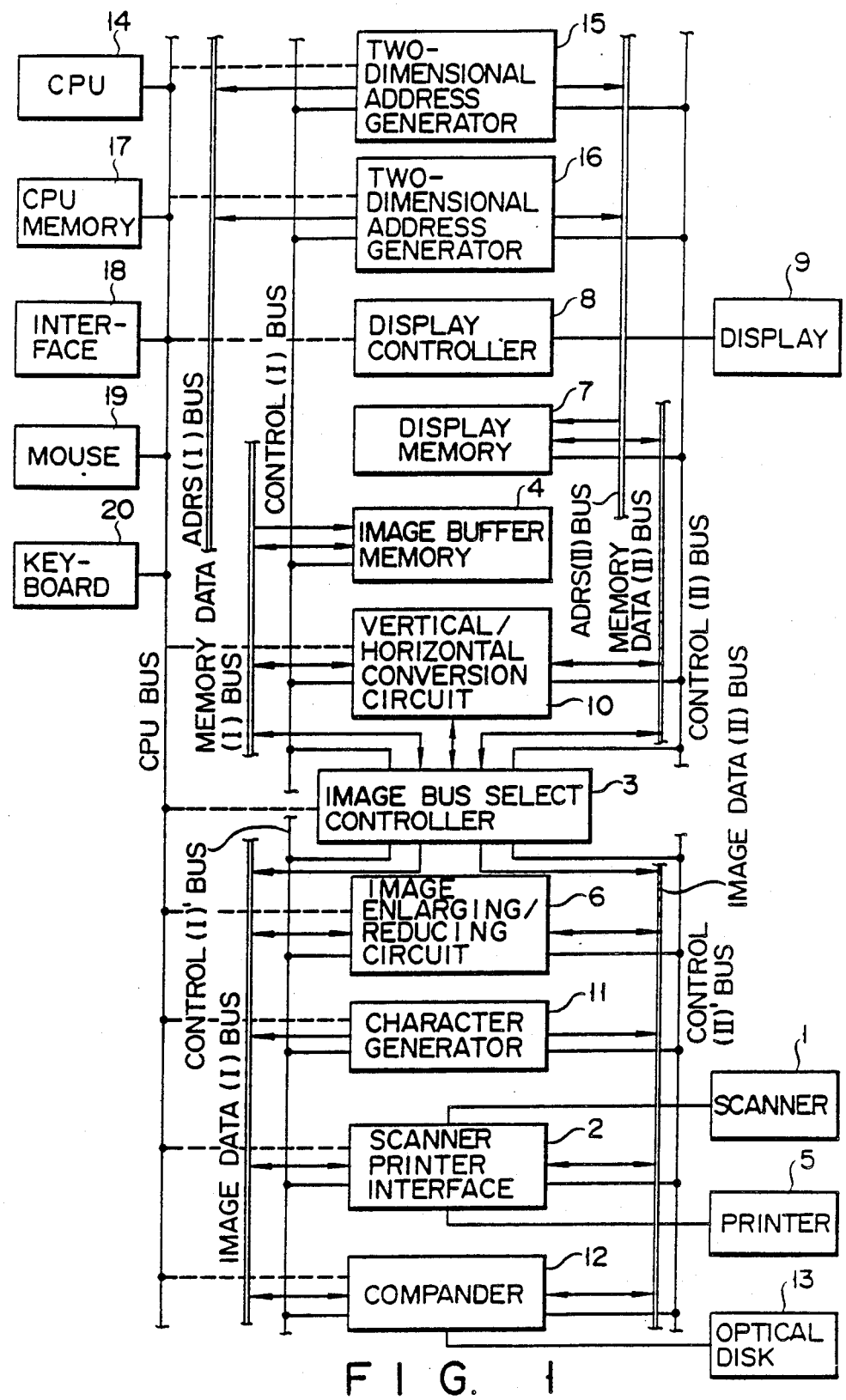
FIG. 1 shows a block diagram of an image information processing apparatus applied to a document filing apparatus with an optical disk memory according to the prevent invention.

In an image information processing apparatus shown in FIG. 1, a scanner 1 and a printer 5 are connected to a scanner/printer printer interface 2. Interface 2 is connected to image data buses (I) and (II), and control buses (I)' and (II)'. These buses (I) and (II), and (I)' and (II)' are coupled with an image-enlarging/reducing circuit 6, a character generator 11, and a compander 12. Compander 12, coupled with an optical disk memory 13, appropriately compresses and expands image information recorded and reproduced on and from optical disk memory 13.

Image buses (I) and (II), and control buses (I)' and (II)' connected through an image bus select controller 3 to memory data buses (I) and (II). Memory data buses (I) and (II), and control bus (I)' and control buses (I) and (II) are coupled with an image buffer memory 4, a display memory 7, a display controller 8, a vertical/horizontal conversion circuit 10 and two-dimensional address generators 15 and 16. Generators 15 and 16 are connected through an address (ADRS) bus (I) to image buffer memory 4, and through an address (ADRS) bus (II) to display memory 7. Display memory 7 is coupled with display controller 8 for controlling a display device 9.

Scanner printer interface 2, image-enlarging/reducing circuit 6, display controller 8, vertical/horizontal conversion circuit 10, character generator 11, compander 12, and two-dimensional address generators 15 and 16 are coupled via the CPU bus to a CPU 14. The CPU bus is connected to a CPU memory 17, an interface 18, a mouse 19, and a keyboard 20.

In the apparatus shown in FIG. 1, the image information read out by scanner 1 is loaded into the apparatus through anterface 2, and stored via image bus select controller 3 into image buffer memory 4.

The image information stored in image buffer memory 4 is subjected to enlarging or reducing by circuit 6, and stored into display memory 7, and is displayed by display device 9 under control of display controller 8. When it is not necessary to enlarge or reduce the image information, image-enlarging/reducing circuit 6 does not perform its operation. The image information is transferred from display memory 7 to image buffer memory 4 in a similar way.

FIG. 2 shows an initial display on the screen of display device 9 in the image information processing apparatus according to the present invention. As shown in FIG. 2, a display area 201 for displaying image information including characters is substantially centered in the display screen. Icons are arrayed in the right portion of display are 201, and give an operator various necessary indications, such as image-enlarging and reducing, and rotation and scroll of the displayed image information. The icons are designated by mouse 19 or related keys on keyboard 20. For example, if the "Enlarge" icon is designated, the image information displayed within display area 21 is enlarged.

The display further contains a function area 202 provided in connection with function keys F1 to F10.

Function area 202 contains icons F1 to F10 indicating various devices for inputting and outputting image information such as scanner 1, printer 5, display device 9, and optical disk memory 13 (file). The functions of these icons F1 to F10 are:

Scanner (F1): To enter the document data from scanner 1, and transfer it to another device.

Printer (F2): To print the document data transferred from another device, by printer 5.

Display (F3): To display the document data transferred from another device by display device 9, and to store the document data into internal image buffer memory 4. Further, this icon indicates that the document data is read out from internal image memory buffer 4 and transferred to another device.

File (F4): To record the document data transferred from another device on optical disk memory 13, to read out the document data from optical disk memory 13, and to transfer it to another device.

Many processing operations can be performed by appropriately combining the above four devices represented by F1 to F4, and by transferring the document data between devices. For example, if the document data is transferred from scanner 1 (F1) to printer 5 (F2), a hard copy of the document data can be obtained.

The image information processing apparatus according to the present invention can execute ten types of document data transfers, or ten types of document data transfer modes as given below, by appropriately combining the scanner (F1), the printer (F2), the display (F3) and the file (F4).

(1) Scanner (F1)/Display (F3); Mode 1 Enter the document data from scanner 1 and to display it on display device 9.

(2) Scanner (F1)/printer (F2); Mode 2 Enter the document data from scanner 1 and to print it by printer 5.

(3) Scanner (F1)/file (F4); Mode 3 Enter the document data from scanner 1 and to record it on optical disk 13.

(4) File (F4)/display (F3); Mode M4 Retrieve the document data from optical disk 13 and to display it in display area 201 of display device 9.

(5) File (F4)/printer (F2); Mode M5 Retrieve the document data from optical disk 13 and print it by printer 5.

(6) Display (F3)/printer (F2); Mode M6 Print out the document data currently displayed within display device 9 by printer 5.

(7) Display (F3)/file (F4); Mode M7 Record the document data currently displayed within display area 201 on optical disk 13.

(8) Scanner (F1)/display (F3)/printer (F2); Mode M8 Enter the document data from scanner 1, and display it on display device 9, and check and print it by printer 5.

(9) Scanner (F1)/display (F3)/file (F4); Mode 9 Enter the document data from scanner 1, display it on display device 9, and check and record it on optical disk 13.

(10) File (F4)/display (F3)/printer (F2); Mode M10 Retrieve the document data from optical disk 13, display it in display device 9, and check and print it by printer 5.

As seem from the above descriptions, most of the retrieving and recording operations of those filing operations can be made by transferring among those devices such as scanner 1, printer 5, display device 9 and optical disk memory (file) 13.

As shown in FIG. 2, DB function in menu bar area 203 contains a display mode, an edition function and DB function. These are for executing the following processing operations.

Display mode: Changes the number of display areas 201 displayed by display device 9 to one of 1 and 4, as shown in FIGS. 2 and 3.

Editing function: Edits the document image displayed in display area 201, for example, composing, layout, text input, etc.

DB function: To format, open and close optical disk 13, and to arrange all of the documents recorded on optical disk 13 under predetermined conditions, and to save the arranged document data into a file or to delete documents meeting predetermined conditions.

As shown in FIGS. 2 and 3, if the display mode in a menu bar area 203 is designated, one and four display areas 201 can be alternately displayed. Four image buffer memories corresponding to the four display areas are provided in the processing apparatus. Also, as shown in FIG. 3 an indicia 204 represented by a black mark is displayed at the top of the menu bar area of one of four display areas 201. When four display areas 201 are used, the document data transferred from scanner 1 or optical disk 13 is displayed on display area 201a including indicia 204. Also, when four display areas are used, indicia 204 indicates that area 201a is to be recorded on optical disk 13 or printed out by printer 5.

Every time the space key on keyboard 20 is depressed, indicia 204 is shifted from one display area to another display area. When the space key is depressed, indicia 204 is cyclically shifted among those four display areas 201. This allows the operator to display a maximum of four documents in desired display areas 201, and further to record the document data in desired display areas 201 on optical disk 13 or to print the desired document data by printer 5.

Figure 3A:
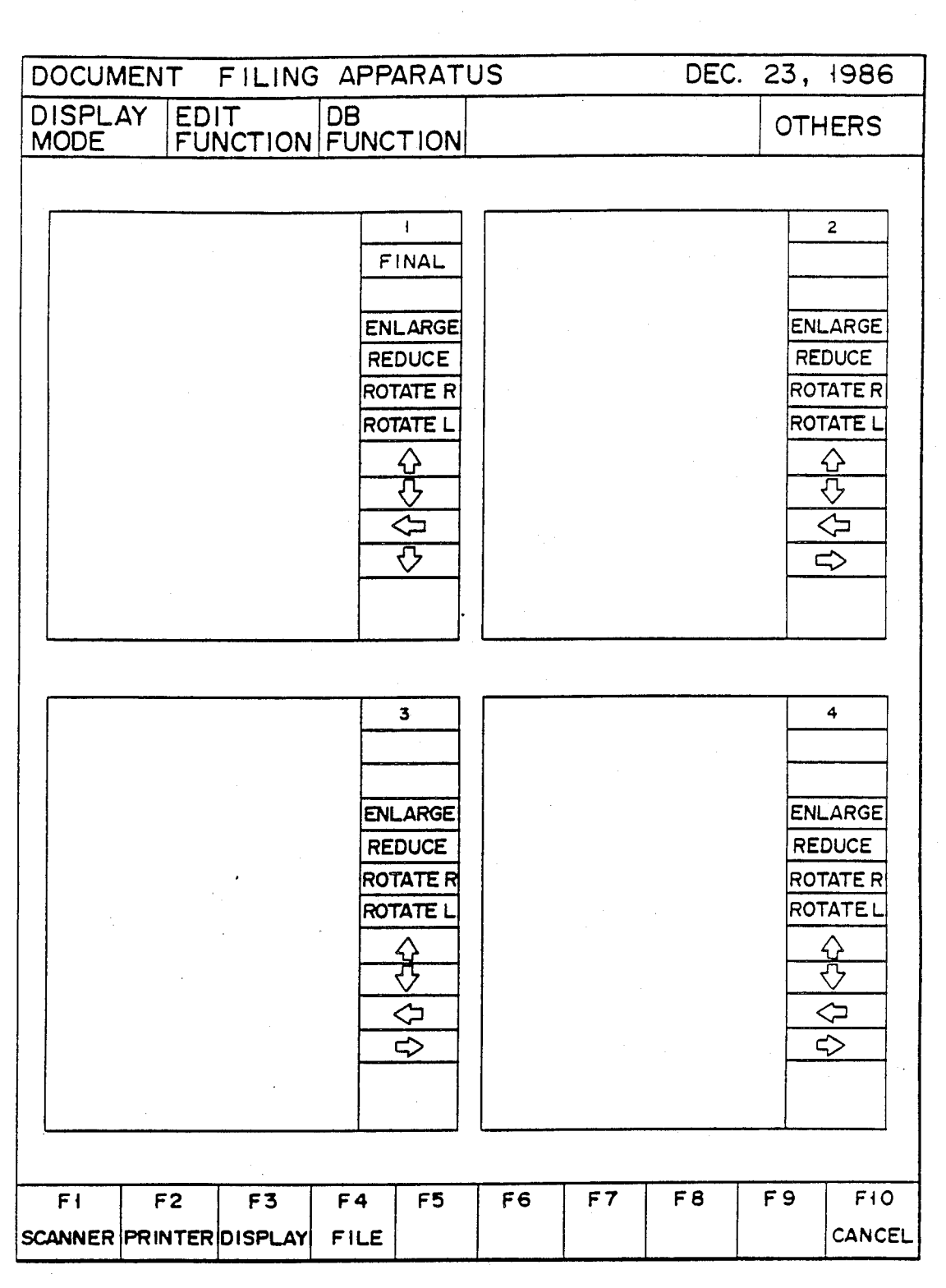
Figure 3B:
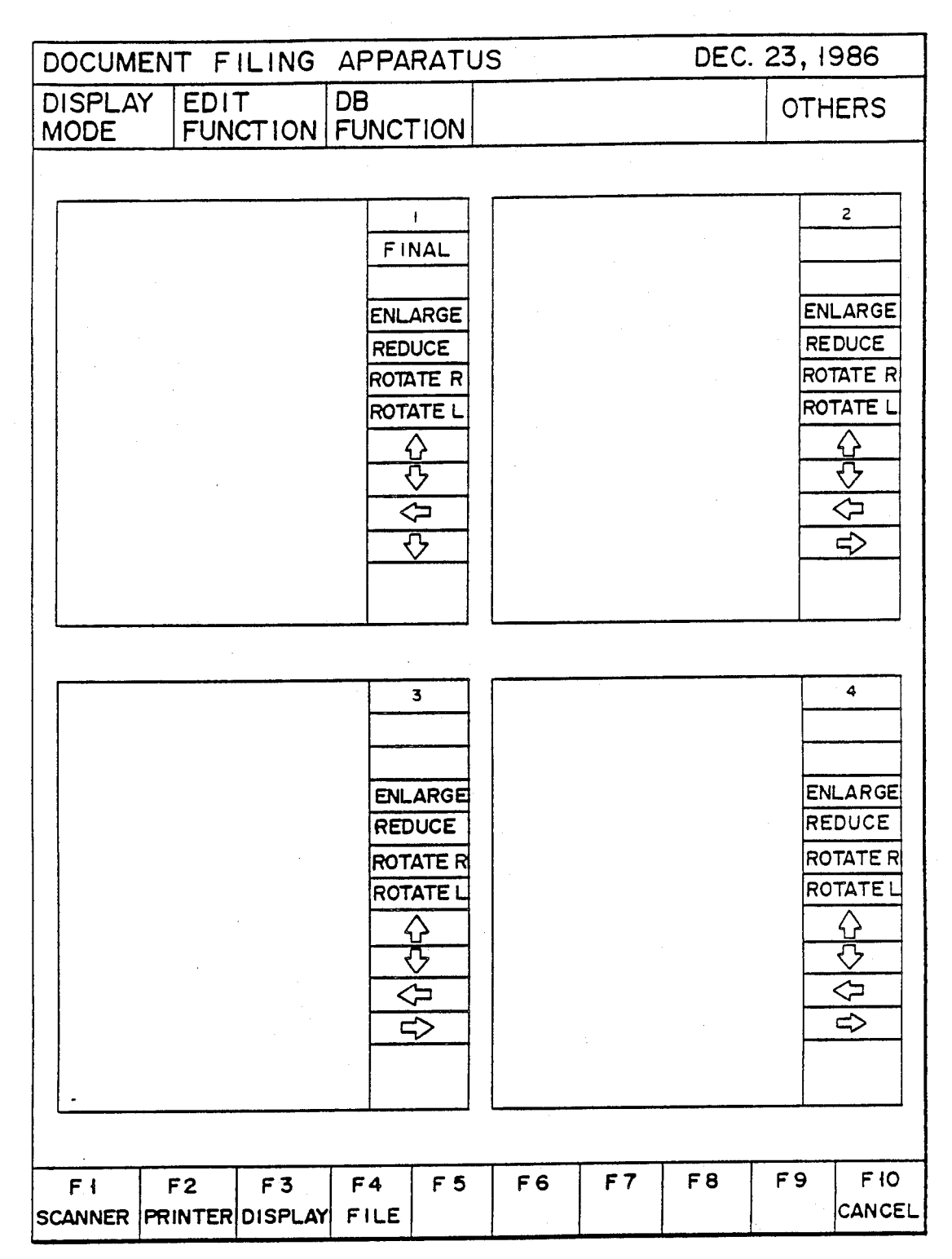

In the display of FIG. 3(a), display area 201a in the upper left on the screen is the input/output display area. In the display of FIG. 3(b), display area 201a is in the right upper is the input/output display area. As shown in FIG. 3(c), indicia 204 represented by a black mark can be represented by other marks such as a stripe mark, etc.

Scanner 1, printer 5, display device 9 and optical disk (file) 13 have their own properties affecting image information transfers. Property sheets for changing or checking the properties of these devices can be displayed by display device 9. FIGS. 4 to 7 show displays with these properties. These properties can be displayed by operating the function keys corresponding to function select keys on keyboard 20. The properties can also be displayed by using mouse 19. In this case, a mouse cursor is moved to a desired icon, and the right button (not shown) of mouse 19 is pushed and released from its pushed state (clicked). To erase the property sheet, key F9 or F10 is pushed on keyboard 20. When using mouse 19 for property sheet erasure, the mouse cursor is set to the icon of F9 (confirmation) or F10(erasure), and the left button (not shown) of mouse 19 is clicked.

As shown in FIG. 4, the property sheet of scanner 1 is used for setting properties such as the size of an input document, document density, read-out resolution, and feed mode (book mode) or ADF (automatic document feed) mode). The book mode enters the image information of one sheet of document. The ADF mode successively enters the image information of the documents contained in the ADF holder.

Figure 5:
FIG. 5 shows a display device displaying printer properties.

As shown in FIG. 5, the property sheet of printer 5 is used for setting the property of the number of copies to print, for example. As shown in FIG. 6, the display property sheet is used for setting a display time in display area 201. The display time is useful when scanner 1 is operating in the ADF mode. For example, when document data are successively transferred from scanner 1, one sheet of the document is displayed for this display time. When the display time terminates, a sequence of entering the next document begins.

As shown in FIG. 7, in the property sheet of optical disk 9, display device 9 displays information indicating the number of documents currently stored in optical disk 13, and which document data is now read out from optical disk 13. When the document data is read out from optical disk 13, the continuous mode or batch mode is selected. This is similar to the automatic feed mode in the scanner property sheet.

Ten types of document data transfers are described below.

Mode 1

In the initial state, display device 9 displays the image as shown in FIGS. 2 and 3. FIG. 8 shows the operations and the transient phases of changing states of the function area when the document data transfer mode of scanner (F1)/display (F3) is performed. Icon Fx (where x=1 to 10) indicates the operation to push a keyboard function key or the operation to click the left button by setting the mouse cursor to the icon corresponding to the function key within the function area.

In operation, as shown in FIG. 8, for example, icon F1 is designated by the mouse cursor and at this designated position, the button of mouse 19 is clicked (step a). In response to the click action, a marking frame is displayed on icon F1 (step (b)). Then, the mouse cursor is moved to icon F3 and the mouse button is clicked, and the marking frame is displayed on F3 icon (step c). Under this condition, when icon F3 is being indicated, if the mouse button is clicked again, the document data transfer from scanner 1 to display device 9 starts. That is, when CPU 14 detects that icon F3 corresponding to the device finally designated has been designated two times, CPU 14 outputs a signal (command) representing an execution of processing.

At this time, icons F1 and F3 are shaded, in step (d). Then, the document data is entered from scanner 1, and the document image is displayed on display area 201a including indicia 204 shown in FIG. 3. At the same time, the "Next page" is displayed on icon F7 in the function area 202, (step e). Under this condition, when icon F7 is designated by mouse 19 or keyboard 20, the next page of document data is transferred from scanner 1 to display device 9. When F10 icon (cancel) is designated, the document filing apparatus can be returned to the initial state in (step f). Icon F10 can be designated at any time. At steps (b) and (c), the designation of icon F1 or icons F1 and F3 is cancelled. At step (e), the document data transfer from scanner 1 to display device 9 is ended.

In summary, the document data transfer is operated in the following way. In the order of the devices to which the document data are transferred, the icons corresponding to those devices are successively designated one time each. Finally, the icon corresponding to the last device is designated a second time. Then, the document data transfer according to an execution signal from CPU 14. The designations already made can be cancelled any time by designating the cancel icon F10, before the document transfer starts.

Modes 2 and 3

FIGS. 9 and 10 diagrammatically show the operation modes 2 and 3 of the scanner (F1)/printer (F2) and the scanner (F1)/file (F4). These operations are almost the same as the scanner (F1)/display (F3) operation. The only difference is that the document data input by scanner 1 is not displayed on display device 9, but is printed out by printer 5 or recorded on optical disk 13.

Modes 4 and 5

FIGS. 11 and 12 are diagramatical representations of the operation modes 4 and 5 of the file (F4)/display (F3) and the file (F4)/printer (F2). In the mode 4 of FIG. 11, the file-to-display document data transfer is executed when icon F4 is designated one time and icon F3 is designated two times. In the mode 5 of FIG. 12, the file-to-print document data transfer is executed when icon F4 is designated one time and icon F2 is designated two times.

In the operations of the above modes 4 and 5 shown in FIGS. 11 and 12, the steps (a) to (b) are the same as those of the previous modes. In step (e), one document is read out from optical disk 13. The read out document data is displayed in display area 201a in the mode 4 of FIG. 11, and is printed out in the mode 5 of FIG. 12. Also in step (e), "Next page" and "Previous page" are displayed on icons F7 and F8. When "Next page" appears, the counter, which indicates which page of the document data being read out, is incremented by one. When "Previous page" appears, the counter is decremented by one. Then the operation returns to step (d), and a similar document transfer is performed. When the cancel icon F10 is designated, the document transfer is ended.

Modes 6 and 7

FIGS. 13 and 14 show the operation modes M6 and M7 of display (F3)/printer (F1) and display (F3)/file (F2). The operations of those modes are similar to the above ones. manely, in step (d), the document data displayed on display area 201a is printed out from printer 5 in the mode M6 of FIG. 13, and is recorded onm optical disk 13 in the mode M7 of FIG. 14. The operations of modes 1 to 7 are for document transfer between two devices. Document transfer among three devices is performed as follows:

Mode 8

FIG. 15 shows a sequence of mode 8 operations of scanner (F1)/display (F3)/printer (F2). In this mode, icons F1 and F3 are designated one time each in a successive manner. Finally, icon F2 is designated two times. When CPU 14 detects that icon F2 has been designated two times, the document data is transferred through the route of scanner 1—display device 9—printer 5.

Steps (a) to (e) are for directing the document data transfer. In step (f), the document data is scanned by scanner 1 and displayed in display area 201a including indicia 204. At this point, the document data has been transferred between scanner 1 and display device 9. Also in step (f), "Print" and "Reenter" are displayed on the icons F7 and F8.

Under this condition, the operator checks the document data in display area 201a. If the operator decides that the density of scanner 1 is improper, he selects the scan property sheet shown in FIG. 4 and alters its properties and designates "Reenter" icon F8. Upon this action by the operator, scanner 1 rescans the document using the properties from the altered property sheet and displays the document data in display area 201a including indicia 204. If the operator decides that the document data in diaplay area 201a is satisfactory, the print icon F7 is designated, so that the document data in display area 201a is transferred between display device 9 and printer 5 (step g). At this time, the icon F7 displays "Next page".

When the icon F7 of displaying "Next page" is designated, the operation returns to step (e), and the mode 8 for the scanner 1—display device 9—printer 5 is reexecuted from the first step. When icon F10 of "Cancel" is designated, the document data transfer operations is stopped. The operation of displaying the property sheets of the printer, displaying and filing, and checking and changing the properties may be performed at any time.

Modes 9 and 10

FIGS. 16 and 17 show a sequence of document data tranfers operations of each of modes 9 and 10. Mode 9 transfers document data among scanner 1 (F1), display device 9 (F3), and optical disk 13 (file) (F4). Mode 10 transfers document data among optical disk 13 (file) (F4), display device 9 (F3) and printer 5 (F2).

In the operation modes, as mentioned above, the properties of scanner 1 and the file each indicates the book mode and the successive read-out mode. Every time one document is transferred, the step to check the displayed document data is needed. This step corresponds to the steps (f) and (g) in FIG. 16.

The operation of the document filing apparatus when the property of scanner 1 is the ADF mode, will now be described. The batch read-out mode operates similarly. FIG. 18 diagrammatically shows a sequence of document data transfer among scanner 1 (F1), display device 9 (F3) and optical disk 13 (file) (F4) when scanner 1 is in the ADF mode. In this operation sequence, the steps (a) to (e) are for directing the document data transfer. This mode is different from the above-mentioned one in that in step (e) "Stop" is displayed on icon F6. Unless the "Stop" icon is designated in step (e), scanner 1 scans and reads out the document data of all of the documents contained in the ADF holder of scanner 1. Each of these documents is displayed for a predetermined period of time on display area 201a, and then these document data are successively stored into optical disk 13.

The display time of a document on display area 201a is set by the display property. When an operator designates the icon "Stop" in step (e), the document data transfer is temporarily stopped, and function area 202 shows the display shown in step (g). Under this condition, if "Reenter" (F8) is designated, scanner 1 reads out the document data.

When the stop of document transfer is removed and the document data transfer is started again, icon (F6) of "Continue" is designated, and the operation returns to step (e). When the document data transfer of the ADF holder contained documents is completed, or when the icon "Cancel" (F10) is designated, the document data transfer is completed and operation passes to step (f).

As described above, when using the image information filing system according to the present invention, the directions for retrieval, recording, and the like can be executed by merely designating three to four icons representing devices.

Figure 19:
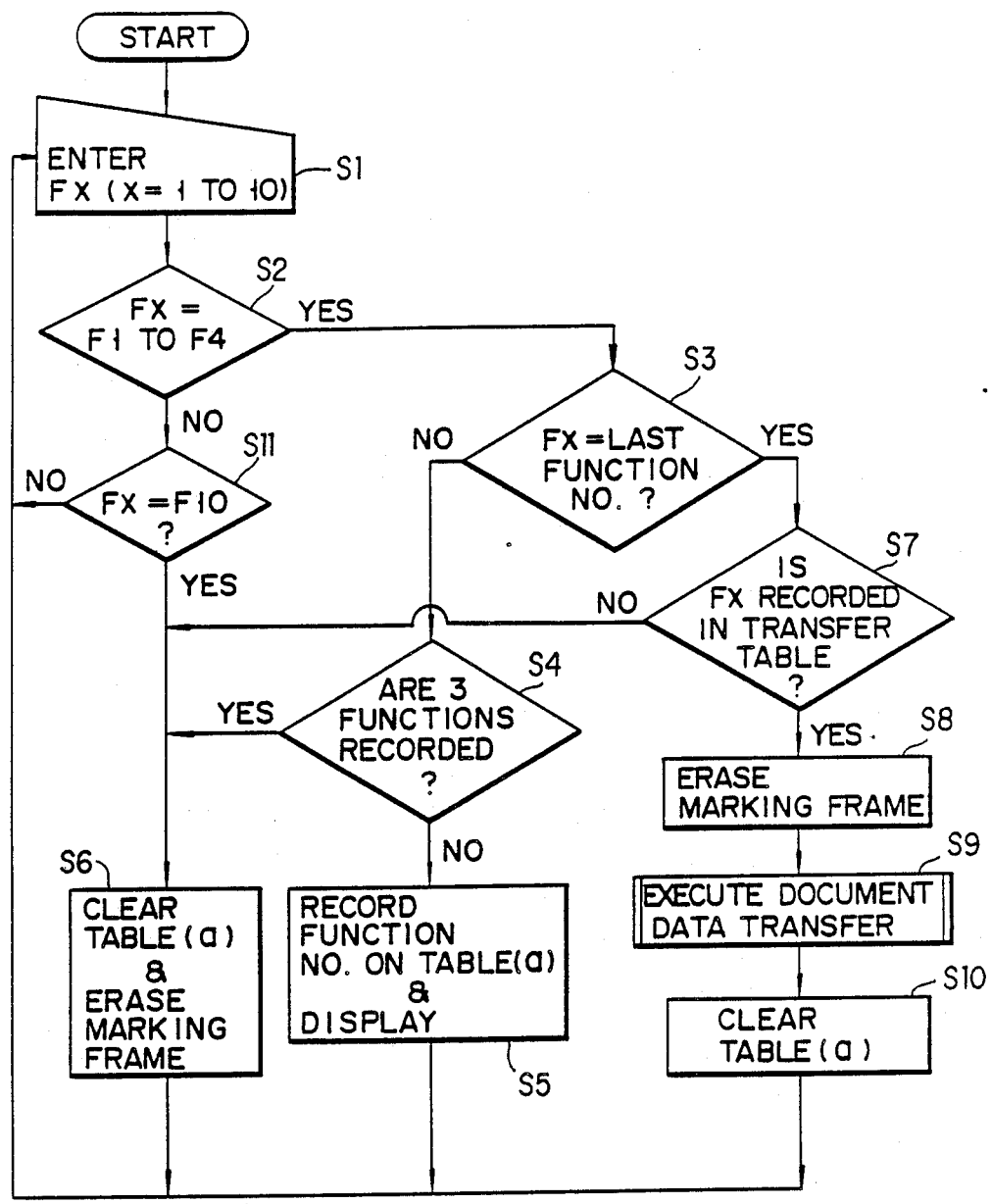
FIG. 19 is a flowchart illustrating a flow of a document data transfer operation.

The operations of the FIG. 1 circuit relating to the document data transfer operations as illustrated in FIGS. 8 to 18, will be described referring to a flowchart of FIG. 19. Tables to be used in the description of the operations are illustrated in FIG. 20. A designation table (a) holds the number of icons designated by the operator, and the order in which the icons were designated. A transfer table (b) holds valid combinations of icons for the document data transfer that can be displayed by the image information processing apparatus, and the order of function numbers. These tables are referred to during the document data transfer processings. These tables (a) and (b) are stored in CPU memory 17.

In operation, when the power supply is turned on, the initial states at the respective portions of the image information processing apparatus are set up according to a program stored in CPU memory 17. At this time, display device 9 displays display area 202, function area 201, and menu bar area 203, as shown in FIG. 2. This display pattern data is the data as transfered from the CPU memory 17 or an external floppy disk to display memory 7. Under this condition, the data corresponding to any of icons F1 to F10 is designated and entered by means of the keyboard or the mouse 19 (S1). The entered data is checked by CPU 14 to determine if it coincides with one of icons F1 to F4 (S2). If the answer is YES, CPU 14 checks if the function number corresponding to the input or entered data coincides with the last function number in the designation table (a) of FIG. 20 (S3). If NO, CPU 14 checks if the function numbers of three or more have been recorded on the designation table (S4). If the answer is No, the number of icons in the designation table is increased by one, and the function number as designated and entered is written into the designation table (S5). The marking frame is displayed on the icon corresponding to the function number recorded anew (S5). After this, the operation returns to step S1.

If more than three function numbers are stored in the designation table, i.e., if the answer in step S4 is YES, the designation table (a) is cleared, and the marking frame of icon is erased (S6). If the designated and entered function number coincides with the last function number in the designation table (S3), the order (e.g., F1–F3) of the function numbers in the designation table (a) is compared with each of the orders (F1–F3, F1–F2, F1–F4, . . . ) of function numbers in the transfer table (b) (S7). If the same order is found, the marking frame in the icon is erased (S8) and the document data transfer processing is started in the order shown in the designation table (a) (S9). For example, when the function numbers are stored in the designation table in the order of F1–F3, the document is read out by scanner 1, and the document data is transferred to image data bus (I) through scanner printer interface 2. The document data in display memory 7 is read out by display controller 8, input to display device 9, and displayed as a document image. Thus, the document data transfer from scanner 1 to display device 9 is automatically performed.

Upon completion of the document data transfer, the designation table (a) is cleared (S10 ) and operation returns to step S1. If the order in the designation table (a) is not registered in the transfer table (b) (S4), the designation table (a) is cleared and the marking frame of the icon is erased (S6), and the operation returns to step S1. If the designated and entered data is F10 (S11), the designation table (a) is cleared, and the marking frame of the icon is erased (S6), and the operation returns to step S1.

If the designation table (a) stores the function numbers in the order of F1–F3–F4 corresponding to the document data transfer operation of FIG. 16, the document is read out by scanner 1, and the document data is transferred to image data bus (II) via scanner printer interface 2. The document data on image data bus (II) is transferred through image bus select controller 3 to image buffer memory 4 and display memory 7. The document data in display memory 7 is read out by display controller 8, and input to display device 9, and displayed in the form of a document image. The document data in image buffer memory 4 is read out, and input to compandar 12 via image bus select controller 3 and the image data bus. The document data is subjected to the companding processing in compander 12, and is input to and stored in optical disk 13 as the file. In this way, the document data 1 is transferred to display device 9 and optical disk 13 from scanner 1.

FIG. 21 is a flowchart showing the operation of FIG. 18 in which the mode of the first device in the document data transfer contains the ADF mode for automatically feeding documents.

When the document data transfer processing begins, CPU 14 checks the read-out mode of the first device (the first device in the designation table (a)), for example, scanner 1, in the document data transfer. When this mode is the batch read-out mode such as the ADF mode, the following operation procedure will be performed. CPU 14 checks if the "Stop" icon is designated (S101). If the answer is NO, the CPU checks whether the document to be transfered to scanner 1 is present or not (S102). If YES, a sequence of document data transfer processings are executed without interruption (S103). For example, when the designation for scanner 1, display device 9 and printer 5 is made, the document data enter, the document display, and the document print are successively executed in connection with the first sequence of document data transfer processings.

After completion of the first sequence of the document data transfer processings, CPU 14 returns to step S101 to check the designation and entering of the "Stop". The second and subsequent sequences of document data transfer processings will be continued uninterruptedly until the "Stop" is designated or no documents remain to transfer. As when no documents remain to transfer, the document data transfer processing ends.

When "Stop" is designated (S101), the document data transfer operation is stopped until the next designation and entering of data. When the "Continue" is designated (S104) CPU 14 returns to check whether or not the document to be transferred is contained in the first device, and enters the control loop for the sequence of document data transfer processings.

In step S104 for designation and entering of data, the function select and F1 to F4 are designated and entered, the property sheets of the devices corresponding to F1 to F4 are displayed and the properties of these devices are checked and if necessary, changed (S105). The control returns to step S104.

Figure 22:
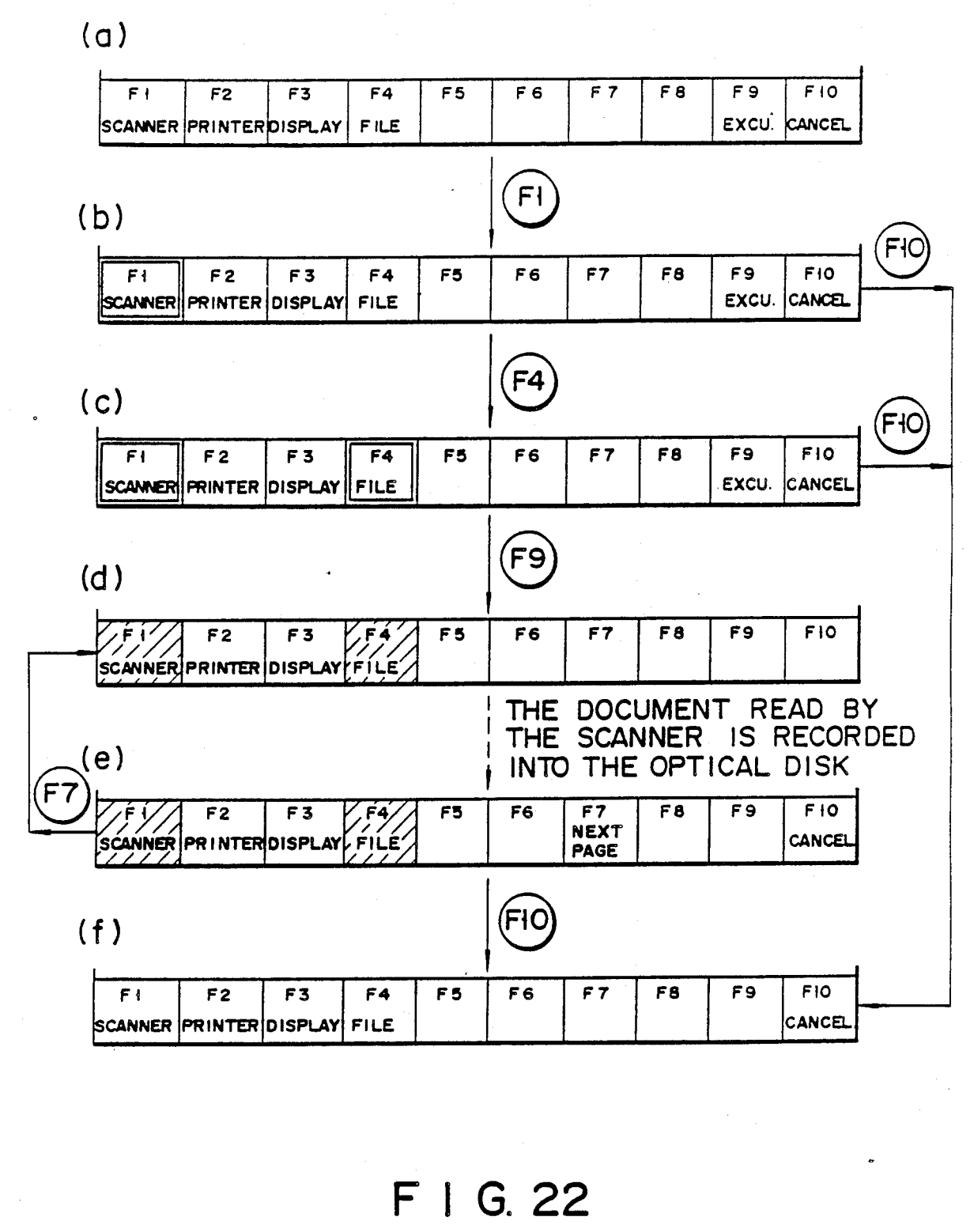

In the above-mentioned embodiment, at the start of document data transfer, the icon corresponding to the finally designated device is designated two times. An alternative measure to start the document data transfer is illustrated in FIG. 22. In FIG. 22, Icon F9 is designated by a mark cursor or by related corresponding function keys on the keyboard. More specifically, as shown in FIG. 22, to start the execution of the mode M3 of the scanner-file document transfer, the icons are designated in the order of F1 (scanner), F4 (file) and F9 (execution). After the start of data transfer processing, the word "Execution" disapears from icon F9.

As described above, the document data transfer processing can be repeatedly executed uninterruptedly by setting the first device in the continuous read-out mode.

As described above, the number of steps for many operations, for example, document data retrieval, is reduced, and the operation shifts can be mede smoothly.

What is claimed is:

1. An image information processing apparatus comprising:
    selecting means for sequentially manually selecting at least two image processing commands from among a plurality of image processing commands including a scanning command, a display command and a file command;
    scanning means for inputting image information from an original image only in response to sequential selection of the scanning command and at least one of the display command and the file command in the selecting means;
    optical memory means for storing the image information input by the scanning means only in response to sequential selection in the selecting means of the scanning command followed by at least one of the file command a sequential combination of the display command and the file command;
    display means, including a display screen having at least two display areas, for displaying the image information from one of the scanning means and the optical memory means in response to one of sequential selection of the scanning command and the display command and sequential selection of the file command and the display command, respectively; and
    designation means for manually designating the one of at least two display areas to display the image information from the one of the scanning means and the optical memory means in only one of at least two display areas.

2. The apparatus of claim 1, wherein the selection means also includes means for selecting a print command from among the plurality of image processing commands, and printing means for printing the image information from one of the scanning means, the display means and the memory means in response to sequential selection in the selection means of one of the scanning command, the display command, and the file command, followed by the printing command.

3. The apparatus of claim 2, wherein the printing means also includes means for printing the image information from one of the scanning means and the memory means in response to sequential selection of one of the scanning command and the file command, respectively, followed by the display command and the print command.

4. The apparatus of claim 1, further comprising buffer memory means for storing the image information inputted by the scanning means.

5. The apparatus of claim 1, wherein the designation means includes an indicia indicating a current display area for displaying the image information and shifting means for cyclically shifting the indicia from one display area to another display area.

6. An image information processing apparatus comprising:
    selecting means for sequentially manually selecting at least two image processing commands from among a plurality of image processing commands including a file command, a display command and a printer command;
    optical memory means for storing the image information;
    display means, including a display screen having at least two display areas, for displaying the image information from the optical memory means in response to sequential selection of the file command and the display command and sequential selection of the file command followed by at least one of the display command and a sequential combination of the display command and the printer command;
    printing means for printing the image information from one of the optical memory means and the display means in response to sequential selection in the selection means of the file command and the printing command and sequential selection in the selection means of the file command, the display command and the printing command; and
    designation means for manually designating the one of at least two display areas to display the image information from the optical memory means in only one of at least two display areas or to print the image information displayed on the one of at least two display areas by the printing means.

7. The apparatus of claim 6, further comprising buffer memory means for storing the image information from the optical memory means.

8. The apparatus of claim 6, wherein the designation means includes an indicia indicating a current display area for displaying the image information from the optical memory means or for displaying the image information to be printed and shifting means for cyclically shifting the indicia from one display area to another display area.

9. An image information processing apparatus comprising:
    selecting means for sequentially manually selecting two image processing commands from among a plurality of image processing commands including a display command and a file command;
    display means, including a display screen having at least two display areas, for displaying the image information;
    optical memory means for storing the image information displayed in only one of the display areas in response to sequential selection in the selection means of the display command and the file command; and
    designation means for manually designating the one of at least two display areas to store the image information displayed in one of at least two display areas in the optical memory means.

10. The apparatus of claim 9, further comprising buffer memory means for storing the image information displayed in the display means.

11. The apparatus of claim 9, wherein the designation means includes an indicia indicating a current display area from which to store the displayed image information into the optical memory means and shifting means for cyclically shifting the indicia from one display area to another display area.

* * * * *